United States Patent
Tulloch et al.

(10) Patent No.: US 7,283,979 B2
(45) Date of Patent: Oct. 16, 2007

(54) METHOD OF TRANSFORMATIONAL BIDDING WITH REBATES AND DISCOUNTS

(75) Inventors: Shane M. Tulloch, Sunnyvale, CA (US); Timothy Valachovic, Bridgeville, PA (US); William D. Rupp, Mt. Lebanon, PA (US)

(73) Assignee: Ariba, Inc., Sunnyvale, CA (US)

( * ) Notice: Subject to any disclaimer, the term of this patent is extended or adjusted under 35 U.S.C. 154(b) by 624 days.

(21) Appl. No.: 09/753,328

(22) Filed: Dec. 29, 2000

(65) Prior Publication Data

US 2001/0032167 A1 Oct. 18, 2001

Related U.S. Application Data

(63) Continuation-in-part of application No. 09/282,157, filed on Mar. 31, 1999.

(51) Int. Cl.
*G06Q 40/00* (2006.01)
(52) U.S. Cl. ............... 705/37; 705/26; 705/27
(58) Field of Classification Search ............. 705/37, 705/1
See application file for complete search history.

(56) References Cited

U.S. PATENT DOCUMENTS

| | | |
|---|---|---|
| 3,637,464 A | 1/1972 | Walsh et al. |
| 3,863,060 A | 1/1975 | Rode et al. |
| 4,597,045 A | 6/1986 | Kiuchi |
| 4,799,156 A | 1/1989 | Shavit et al. |
| 5,629,982 A | 5/1997 | Micali |
| 5,799,285 A | 8/1998 | Klingman |
| 5,803,500 A | 9/1998 | Mossberg |
| 5,809,483 A | 9/1998 | Broka et al. |

(Continued)

FOREIGN PATENT DOCUMENTS

EP 0 399 850 A 11/1990

(Continued)

OTHER PUBLICATIONS

Virginia Power to Seek 1,750 MW More Through Competitve Bidding, Electric Utility Week, p. 15, Mar. 14, 1998.*

(Continued)

*Primary Examiner*—Jagdish Patel
(74) *Attorney, Agent, or Firm*—Van Pelt, Yi & James LLP (57) ABSTRACT

A machine implemented method for transforming bidding with rebates and discounts in an online auction is described herein. In one embodiment, a method includes receiving a first bid from a first bidder and a second bid from a second bidder over a network, where at least one of a rebate and discount is offered with at least one of the first and second bids and the first and second bidders are seller bidders. In response, the method assigns a first value and a first unit of measurement for the first bid and a second value and second unit of measurement for the second bid using in part the at least one of a rebate and discount offered with at least one of the first and second bids, and transforms the first and second values to third and fourth values, respectively, having a standard unit of measurement, where the third and fourth values represent the first and second bids of the first and second bidders in view of the standard unit of measurement.

21 Claims, 7 Drawing Sheets

U.S. PATENT DOCUMENTS

| | | | |
|---|---|---|---|
| 5,832,496 | A | 11/1998 | Anand |
| 5,862,223 | A | 1/1999 | Walker et al. |
| 5,897,621 | A | 4/1999 | Boesch et al. |
| 5,905,974 | A | 5/1999 | Fraser et al. |
| 5,915,209 | A | 6/1999 | Lawrence |
| 5,966,699 | A | 10/1999 | Zandi |
| 6,014,627 | A | 1/2000 | Togher et al. |
| 6,021,398 | A | 2/2000 | Ausubel |
| 6,023,685 | A | 2/2000 | Brett et al. |
| 6,026,383 | A | 2/2000 | Ausubel |
| 6,035,287 | A | 3/2000 | Stallaert et al. |
| 6,047,274 | A | 4/2000 | Johnson et al. |
| 6,052,108 | A | 4/2000 | Gadd |
| 6,055,518 | A | 4/2000 | Franklin et al. |
| 6,058,379 | A | 5/2000 | Odom et al. |
| 6,061,663 | A | 5/2000 | Bloom et al. |
| 6,078,906 | A | 6/2000 | Huberman |
| 6,119,229 | A | 9/2000 | Martinez et al. |
| 6,131,087 | A | 10/2000 | Luke et al. |
| 6,134,536 | A * | 10/2000 | Shepherd ............... 705/37 |
| 6,151,589 | A | 11/2000 | Aggarwal et al. |
| 6,161,099 | A | 12/2000 | Harrington et al. |
| 6,178,431 | B1 | 1/2001 | Douglas |
| 6,216,108 | B1 * | 4/2001 | LeVander ............... 705/7 |
| 6,230,146 | B1 | 5/2001 | Alaia et al. |
| 6,236,972 | B1 * | 5/2001 | Shkedy ............... 705/1 |
| 6,266,652 | B1 | 7/2001 | Godin et al. |
| 6,275,807 | B1 | 8/2001 | Schirripa |
| 6,343,277 | B1 | 1/2002 | Gaus et al. |
| 6,366,891 | B1 | 4/2002 | Feinberg |
| 6,647,373 | B1 * | 11/2003 | Carlton-Foss ............... 705/37 |
| 6,778,968 | B1 * | 8/2004 | Gulati ............... 705/37 |
| 2002/0013631 | A1 | 1/2002 | Parunak et al. |

FOREIGN PATENT DOCUMENTS

| | | |
|---|---|---|
| JP | 410078992 A | 4/1997 |
| JP | 409101994 A1 | 3/1998 |
| WO | WO92/15174 | 9/1992 |
| WO | WO98/34187 A1 | 8/1998 |
| WO | WO99/63461 | 12/1999 |

OTHER PUBLICATIONS

Through the bidding maze. (how to avoid common errors in presenting your bid to Uncle Sam)☐☐Klugman, Ellen, Working Woman, v8, p. 56(2) Mar. 1983.*

J. Sairamesh, et al., "Economic Framework for Pricing and Charging in Digital Libraries," D-Lib Magazine, ISSN 1082-9873 (Feb. 1996).

Online Bidding Software, Electronic Buyers' News, Issue No. 1072, p. 86, 1/6p (Aug. 25, 1997).

"FairMarket Launches New Self-Serve Auctions," Business Wire, p. 6161495 (Jun. 16, 1998).

"Broadvision Developing First Interactive Commerce Management System to Suporrt Online Sales & Marketing Process; New Software Category Necessary to Interactive Network Architecture," Business Wire, p. 5150152 (May 15, 1995).

Lee, Ho Geun, "Do electronic marketplaces lower the price of goods/" Communicaitons of the PCM, V. 41, No. 1, pp. 73-80 (Jan. 1998).

"Sold! . . . To the Lowest Bidder," Computer Finance, vol. 6, No. 2, (Jul. 1995).

"Venture Capitalists Fund Two Massachusettes Internet Related Companies," Boston Globe (Jan. 14, 1998).

Von det Fehr, et al., "Predatory bidding in Sequential Auctions," Oxford Economic Papers, vol. 46, No. 3, p. 345(12) (Jul. 1994).

"Moai Technologies Introduces New Categories of Business to Business Auction Software," Business Editors and Computer Writers (Mar. 16, 1998).

H. Kikuchi, Michael Harkavy, and J.D. Tygar, Multi-round Anonymous Auction, In Proceedings of the First IEEE Workshop on Dependable and Real-Time E-Commerce Systems, pp. 62-69, Jun. 1998.

Vigoroso, "Buyers prepare for brave new World of E-Commerce," Purchasing, vol. 126, No. 6, p. S4(1) (Apr. 22, 1999).

"What you need to know to bid in FCC's Narrowband Auction," Washington Telecom News, vol. 2, No. 26, p. 6(2) (Jun. 27, 1994).

M. Reck, "Types of Electronic Auctions," Hochschule St. Gallen.

C. Wrigley, "Design Criteria for Electronic Market Servers," Electronic Markets, vol. 7, No. 4 (1997).

Wurman et al., "The Michigan Internet AuctionBot: A Configurable Auction Server for Human and Software Agents," Artificial Intelligence Laboratory, University of Michigan (1998).

PCT Notification of Transmittal of International Preliminary Examination Report for PCT Counterpart Application No. PCT/US00/08522 Containing International Preliminary Examination Report (Nov. 19, 2001).

* cited by examiner

Buyer's View

| Bidder | Bid Time | Bid (¢/M*Btu) |
|---|---|---|
| Sup A | 01:05:51 | 98.2 |
| Sup B | 01:06:08 | 97.4 |
| Sup D | 01:06:49 | 101.3 |
| Sup C | 01:08:10 | 96.7 |
| Sup B | 01:15:09 | 95.5 |
| Sup D | 01:17:38 | 97.2 |
| Sup B | 01:18:57 | 96.2 |
| Sup E | 01:20:03 | 97.1 |
| Sup A | 01:25:28 | 94.8 |

Fig. 5A

Supplier A's View

| Bidder | Bid Time | Bid ($/ton) |
|---|---|---|
| Sup A | 01:05:51 | 20.92 |
| Sup B | 01:06:08 | 20.00 |
| Sup D | 01:06:49 | 24.48 |
| Sup C | 01:08:10 | 19.20 |
| Sup B | 01:15:09 | 17.82 |
| Sup D | 01:17:38 | 19.77 |
| Sup B | 01:18:57 | 18.62 |
| Sup E | 01:20:03 | 19.66 |
| Sup A | 01:25:28 | 17.01 |

Fig. 5B

Supplier B's View

| Bidder | Bid Time | Bid ($/ton) |
|---|---|---|
| Sup A | 01:05:51 | 20.00 |
| Sup B | 01:06:08 | 19.01 |
| Sup D | 01:06:49 | 23.83 |
| Sup C | 01:08:10 | 18.15 |
| Sup B | 01:15:09 | 16.67 |
| Sup D | 01:17:38 | 18.77 |
| Sup B | 01:18:57 | 17.53 |
| Sup E | 01:20:03 | 18.64 |
| Sup A | 01:25:28 | 15.80 |

METHOD OF TRANSFORMATIONAL BIDDING WITH REBATES AND DISCOUNTS

REFERENCE TO RELATED APPLICATIONS

This application is a continuation-in-part of U.S. patent application Ser. No. 09/282,157, entitled "Method and System for Conducting Electronic Auctions with Multi-Parameter Price Equalization Bidding," filed on Mar. 31, 1999 in the name of Sam E. Kinney, Jr., Vincent F. Rago, Glen T. Meakem, Robert G. Stevens, David J. Becker, Anthony F. Bernard, William D. Rupp, Daniel C. Heckmann, Julia L. Rickert, Shane M. Tulloch, Jennifer L. Riddle, Nikki A. Sikes, and John P. Levis, III, assigned to the assignee of the present Application, FreeMarkets, Inc. The entirety of that earlier filed, co-pending patent application is hereby expressly incorporated herein by reference.

FIELD OF THE INVENTION

The invention relates generally to conducting online electronic auctions, and in particular, to business-to-business auctions with rebates and discounts.

BACKGROUND OF THE INVENTION

Procurement Models

It is believed that procurement of goods and services has traditionally involved high transaction costs. The cost of finding and qualifying potential bidders has been particularly high. The advent of electronic commerce has introduced new methods of procurement that lower some of the transaction costs associated with procurement. Electronic procurement, and in particular business-to-business electronic procurement, matches buyers and suppliers and facilitates transactions that take place on networked processors.

At least three models of electronic procurement have been developed: catalog, buyer-bidding auctions, and seller-bidding auctions. The "catalog" model was an early form of online electronic procurement. Initially, electronic catalogs were developed primarily by sellers, typically suppliers, to help customers obtain information about products, and order supplies electronically. Those first electronic catalogs were typically single-source; i.e. they only allowed customers to obtain information and products from that supplier.

Although the first electronic catalogs reduced the information search cost associated with procurement, it is believed that customers were disadvantageously "locked in" to one supplier at each electronic catalog. Customers were thus unable to compare a number of competing products in a single catalog. Therefore, certain suppliers with single-source catalogs began including competitors' products in their systems. The inclusion of competing products in electronic catalogs reduced procurement information search costs even further. By offering competing products, electronic catalogs became "electronic markets." Electronic commerce using the electronic catalog model typically involves one buyer and one seller at a time. When many buyers compete for the right to buy from one seller, a buyer-bidding auction model, or forward auction, may be created. Catalog and buyer-bidding auction models, however, may have limitations and may not work well in every situation.

Supplier-bidding auctions for products and services defined by a buyer have been developed. In a supplier-bidding auction, bid prices may start high and move downward in reverse-auction format as suppliers interact to establish a closing price. The auction marketplace is one-sided, i.e., one buyer and many potential suppliers. Typically, the products being purchased are components or materials. "Components" typically mean fabricated tangible pieces or parts that become part of assemblies of durable products. Example components include gears, bearings, appliance shelves, or door handles. "Materials" typically mean bulk quantities of raw materials that are further transformed into product. Example materials include corn syrup or sheet steel.

Industrial buyers may not purchase one component at a time. Rather, they may purchase whole families of similar components. These items may therefore be grouped into a single lot. Suppliers in industrial auctions may provide unit price quotes for all line items in a lot.

Auction Process

Traditional online auctions focus on price as the sole variable upon which the online competition is based. It is believed that price is the sole bidding parameter that is provided by the bidders and hence is the sole parameter upon which a selection process is made. Relative valuations between different bid prices may be quick and intuitive.

In many types of business transactions, price may not be the sole parameter upon which a decision is made. For example, in the negotiations for a supply contract, a buyer may compare various proposals not only on the basis of price but also on the basis of the non-price characteristics of non-standard goods, the location of the supplier, the reputation of the supplier, etc. In a typical business-to-business situation, a plurality of parameters may be considered in combination with the supplier's price proposal.

In these situations, purchasers may negotiate with each supplier independently because multi-parameter bids may not be readily compared. Actual comparisons by the purchaser may be based on a combination of subjective and objective weighting functions. Bidders may not have access to information on the buyer-defined weighting functions. At most, bidders may be selectively informed (at their disadvantage) of aspects of other competing bids. The limited communication of information between bidders may limit the potential of true competition between the bidders. The absence of competition lowers the likelihood that the bidders may approach their true walk-away bid. Further, the manual weighting process may be time consuming and subject to inconsistency from one application to the next.

SUMMARY OF THE INVENTION

The present invention provides a method of conducting an auction using transformational bidding with rebates and discounts. The method includes receiving a first bid from a first bidder and a second bid from a second bidder, assigning a first value and a first unit of measurement for the first bid and a second value and second unit of measurement for the second bid, and transforming the first and second values to third and fourth values, respectively, having a standard unit of measurement. At least one of a rebate and discount is offered with at least one of the first and second bids, A system for conducting an auction using transformational bidding with rebates and discounts is also disclosed. The system includes a database for receiving and storing bid information, including rebates and discounts, from at least one bidder and software for transforming bid information into values having a standard unit of measure.

The present invention also provides a machine readable medium that transforms bids with rebates and discounts. The machine readable medium includes a first machine readable code that receives bid information from a bidder, a second machine readable code that receives at least one of a rebate and discount from the bidder, a third machine readable code that generates a transformed bid using the bid information and the at least one of the rebate and discount, and a fourth readable code that transmits the transformed bid information to an auction server to generate a relative comparison of bids on a common competitive basis.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings.

DETAILED DESCRIPTION

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The present invention provides a method of conducting an auction using transformational bidding with rebates and discounts. The method includes receiving a first bid from a first bidder and a second bid from a second bidder, wherein at least one of a rebate and discount is offered with at least one of the first and second bids, assigning a first value and a first unit of measurement for the first bid and a second value and second unit of measurement for the second bid, and transforming the first and second values to third and fourth values, respectively, having a standard unit of measurement. The method of the present invention can be applied to both reverse and forward auctions. In addition, the method is particularly applicable to online auctions where bidders submit bids to an auction coordinator electronically during the auction process.

The present invention is designed to create a market of competition in business transactions that traditionally could not take advantage of natural auction dynamics. Competition is fostered through the transformation of multi-parameter bids into comparable units of measure. This transformation process enables an apples-to-apples comparison of disparate bids. The following description of the features of the present invention is presented in the context of downward-based online industrial auctions. As would be appreciated by one of ordinary skill in the relevant art, these inventive features could also be applied in the context of upward-based online auctions as well.

Figure 1A:
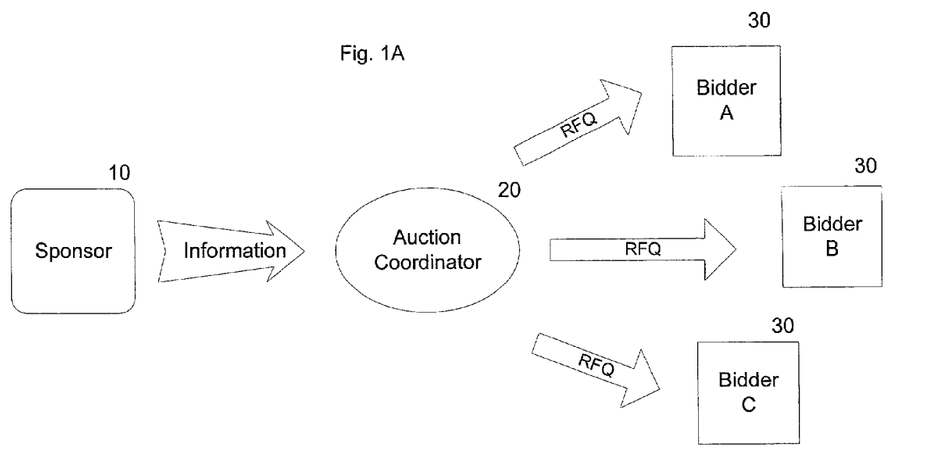
FIG. 1A is a flow diagram of a request for quotation in an auction.

The basic process for a purchaser sponsored supplier-bidding or reverse auction, as conducted by the assignee of the present invention, is described below with reference to FIG. 1. FIG. 1 illustrates the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

In the supplier-bidding reverse auction model, the product or service to be purchased is preferably defined by the sponsor 10 of the auction, as shown in FIG. 1A. Alternatively, the buyer may set up all or some of their own bidding events and find their own suppliers. In that case, the sponsor 10 would run the events through the market operations center, which is a facility where auctions are monitored and participants receive assistance. In FIG. 1A, when the sponsor 10 decides to use the auctioning system of the present invention to procure products or services, the sponsor 10 may provide information to an auction coordinator 20. That information may include information about incumbent suppliers and historic prices paid for the products or services to be auctioned, for example. Preferably, the sponsor 10 also works with the auction coordinator 20 to define the products and services to be purchased in the auction and, if desired, lot the products and services appropriately so that needed products and services can be procured using optimal auction dynamics. A specification may then be prepared for each desired product or service, and a Request for Quotation ("RFQ") generated for the auction.

Next, the auction coordinator 20 may identify potential suppliers 30, preferably with input from the sponsor 10, and invite the potential suppliers 30 to participate in the upcoming auction. The suppliers 30 that are selected to participate in the auction may become bidders 30 and may be given access to the RFQ, typically through an RFQ in a tangible form, such as on paper or in an electronic format.

Figure 1B:
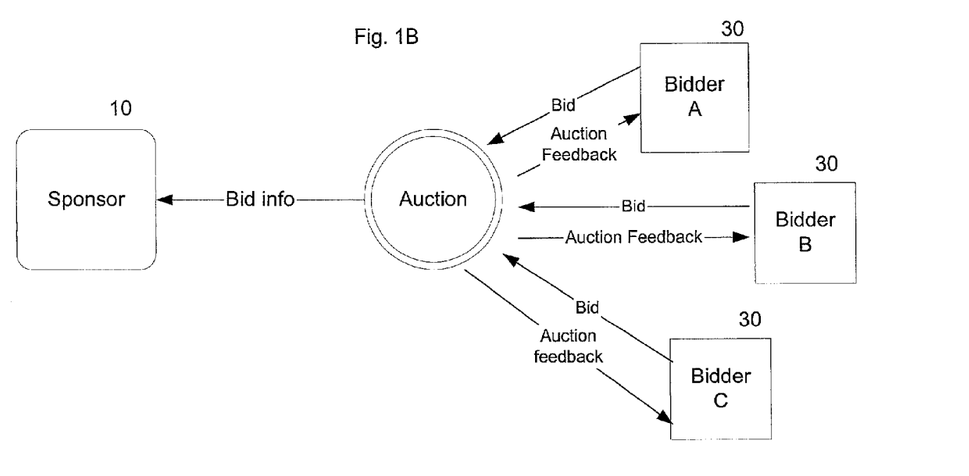
FIG. 1B is a flow diagram of a bidding process in an auction.
Figure 1C:
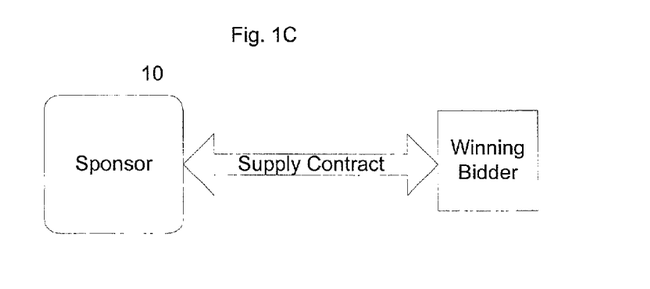
FIG. 1C is a flow diagram of a contract award following an auction.

As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 may typically monitor the bidding as it occurs. Bidders 30 may also be given market feedback during the auction so that they may bid competitively.

After the auction, the auction coordinator 20 may analyze the auction results with the sponsor 10. The sponsor 10 may conduct final qualification of the low bidding supplier or suppliers 30. The sponsor 10 may furthermore retain the right not to award business to a low bidding supplier 30 based on final qualification or other business concerns. As shown in FIG. 1C, a supply contract may be drawn up and executed based on the results of the auction.

The auction may be conducted electronically between bidders 30 at their respective remote sites and the auction coordinator 20 at its site. Alternatively, instead of the auction coordinator 20 managing the auction at its site, the sponsor 10 may perform auction coordinator tasks at its site. Information may be conveyed between the coordinator 20 and the bidders 30 via any known communications medium.

Figure 2:
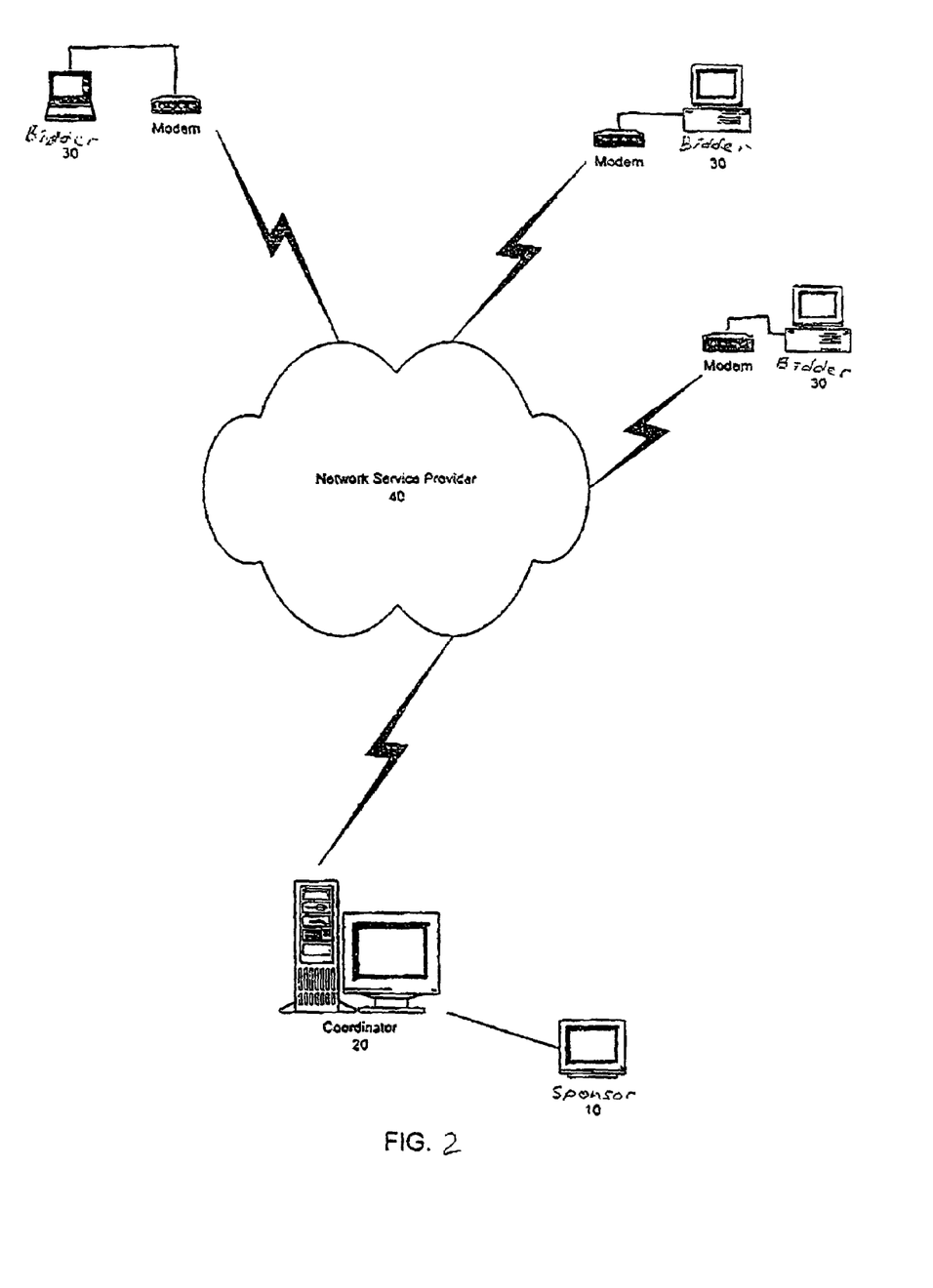
FIG. 2 is a schematic illustration of communications links between the coordinator, the buyer, and the suppliers in an auction.
Figure 3:
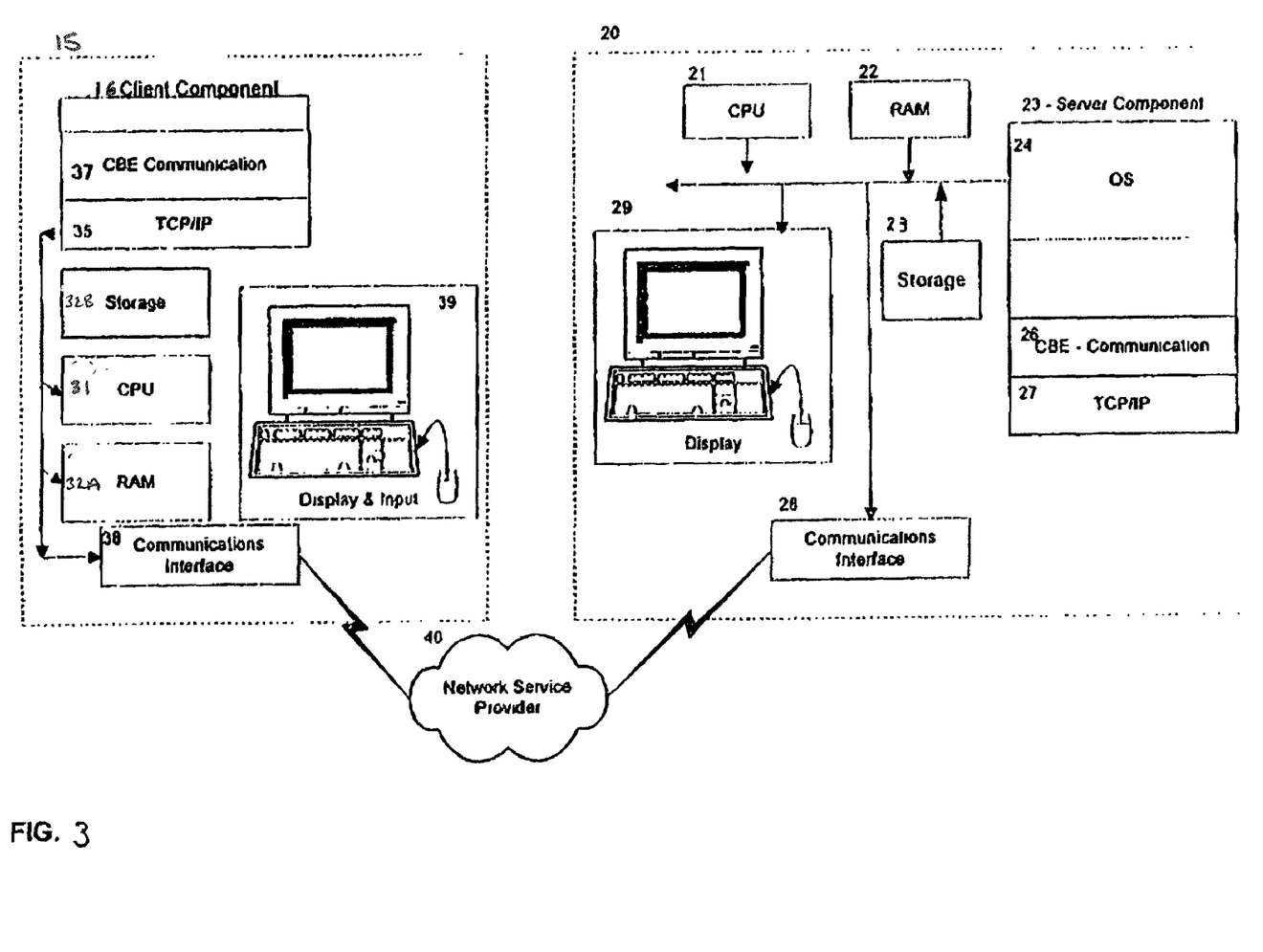
FIG. 3 is a schematic illustration of auction software and computers hosting that software in an auction.

In one embodiment, the auction is conducted electronically between potential suppliers 30 at their respective remote sites and the coordinator 20 at its site. As shown in FIGS. 2 and 3, information may be conveyed between the coordinator 20 and the suppliers 30 via a communications medium such as a network service provider accessed by the participants through, for example, dial-up telephone connections using modems, or direct network connections. A computer software application may be used to manage the auction. The software application has two components: a client component 16 and a server component 23. The client component 16 may operate on a computer at the site of each of the potential suppliers 30. Suppliers 30 make bids during the auction using the client component. The bids may be sent via the network service provider to the site of the coordinator, where it is received by the server component 23 of the software application. The client component 16 may include software used to make a connection through telephone lines or the Internet to the server component 23. Bids may be submitted over this connection and updates may be sent to the connected suppliers.

Bids may only be submitted using the client component 16 of the application—this ensures that buyers do not circumvent the bidding process, and that only invited suppliers participate in the bidding. Bidders may see their bids and bids placed by other suppliers for each lot on the client component 16. When a bidder submits a bid, that bid is sent to the server component 23 and evaluated to determine whether the bid is from an authorized bidder, and whether the bid has exceeded a pre-determined maximum acceptable price. Bids placed by a supplier may be broadcast to all connected bidders, thereby enabling every participating bidder to see quickly the change in market conditions and begin planning their competitive responses.

As noted, multi-parameter bids cannot be readily compared. Comparison of multi-parameter bids cannot be realized unless the relative impact (or weighting) of each of the individual bidding parameters is known. Intuition that is based on subjective assessments (or valuations) of multiple bid parameters cannot create an efficient market because subjective assessments are inconsistently applied and applied after lengthy delays. Multi-parameter bid transformation enables true auction competition because it forces a greater degree of objectivity into the valuation process and is accomplished in real-time, allowing an auction dynamic to occur. Comparison of bids can therefore be accomplished in accordance with one or more comparative bid parameters.

Figure 4:
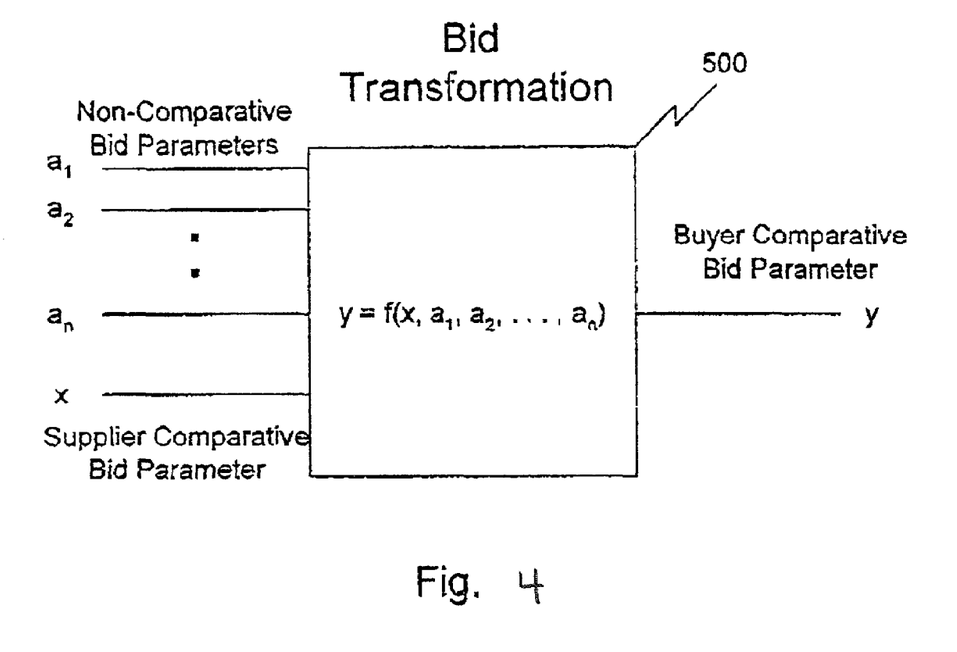
FIG. 4 is a schematic illustration of a bid transformation function.

A generic transformation mechanism is illustrated in FIG. 4. As illustrated, bid transformation 500 represents a function (f) that is operative on input variables (x) and ($a_1 \ldots a_n$). Input variables ($a_1 \ldots a_n$) represent non-comparative bid parameters, while input variable (x) represents a supplier comparative bid parameter (e.g., price). The output of bid transformation 500 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via lookup tables. In yet another embodiment, the transformation function is a combination of an analytic linear function, analytic non-linear function, and table lookup function. The combination can be nested more than one layer deep.

In the generic description of the transformation process in FIG. 4, two types of comparative bid parameters exist. A buyer comparative bid parameter (y) refers to a parameter, resulting from the transformation process, upon which the buyer will compare competing bids. A supplier comparative bid parameter (x), on the other hand, refers to an input to the transformation function (f). As will be described in greater detail below, the supplier comparative bid parameter can be used by a supplier to compare competing bids in the supplier's context. In some applications, the supplier comparative bid parameter is not used because all parties may be allowed to view the auction in the buyer's context.

As noted, non-comparative bid parameters are also used as inputs to the transformation process. Unlike supplier comparative bid parameters, non-comparative bid parameters (e.g., non-price parameters) are not directly used to compare competing bids.

In this transformation framework, a supplier comparative bid parameter value can be modified by the transformation process based upon non-comparative bid parameter values to yield a buyer comparative bid parameter value. This scenario is discussed below in the context of the coal market.

Alternatively, the transformation process can use multiple non-comparative bid parameters to create a buyer comparative bid parameter. In this case, no supplier comparative bid parameters are used to create supplier specific views. All parties view the competition in the same context. An example of this scenario is net present value (NPV) bidding, where parameters specifying multi-year contracts are converted into a total NPV bid. The total NPV bid represents a sum of a series of payments over multiple contract years, which are discounted to a present value using a predefined discount rate structure. NPV bidding is described in co-pending U.S. application Ser. No. 09/282,156, entitled "Method and System for Conducting Electronic Auctions with Net Present Value Bidding", the disclosure of which is hereby expressly incorporated in the present application ("the '156 Application").

Where a single buyer comparative bid parameter (e.g., price) is output by the transformation process, competition between bids is based on the relative magnitude of the values of the buyer comparative bid parameter associated with each of the bidders. This relative magnitude of the comparative bid parameters can be illustrated on a one-dimensional plot. Where multiple buyer comparative bid parameters are output by the transformation process, competition between bids can be compared using a multiple dimensional plot. In most cases, the use of a single buyer comparative bid parameter is advantageous because it provides the simplest means for all parties to unambiguously determine a relative ranking of bids.

The concepts and features of the present invention are now illustrated in the context of a particular application within the coal market. Coal purchase decisions are based on a variety of factors relating to the characteristics of the coal as well as the characteristics of the buyer's needs and physical facilities. Characteristics of the coal include factors such as thermal content (BTU/lb), percentage sulfur, percentage ash, percentage water/moisture, hardness, etc. Relevant characteristics of the buyer include the time frame of required delivery, types of power generation units, etc.

During negotiations with multiple coal suppliers, each of the relevant factors are evaluated in combination to determine the relative attractiveness of each of the received bids. The evaluation process is often a combination of subjective judgment, based on instinct and experience, and hard quantitative analysis. As one can readily appreciate, this evaluation process, although typical, is time consuming and adds great uncertainty for the suppliers.

Time delays are inherent since each supplier is negotiated with independently. Suppliers face great uncertainty in this process because the internal subjective/quantitative metrics used by the buyer in the evaluation process are inconsistently applied. Negotiation tactics dictate that the subjective/quantitative metrics used by the buyer are not provided to the suppliers. This confidential information gives the buyer leverage in altering the supplier's perception of the relative attractiveness of the submitted bid. During the negotiation process, suppliers may be selectively informed (at their disadvantage) of aspects of the decision making process.

Limited communication of information to the suppliers limits the potential of true competition between the suppliers. The absence of competition lowers the likelihood that the suppliers will approach their best offer.

The present invention creates true competition between suppliers in an auction system that enables comparison of truly disparate bids. While traditional auctions focus on price as the sole variable of online competition, the present invention also factors in non-price variables into the bid evaluation and award process.

In the coal market example, the buyer may be ultimately interested in the price per unit energy produced when the coal is processed through their power generation unit. As noted, all coal is not created equal. The characteristics of the particular coal being offered by a supplier are unique to the supplier. Moreover, different power generation units will produce different quantities of energy from identical coal, due to engineering differences built into the power generation units.

Bids for coal are typically submitted on a price per physical measure of weight or volume (e.g., $/ton) basis. The raw $/ton bids of the participating suppliers cannot be readily compared to each other due to the underlying characteristics of the coal. A mechanism is therefore required to transform each of the bids into a context that enables an apples-to-apples comparison such that the buyer can choose the most competitive bid. In the coal market example, the transformation process is designed to transform the $/ton bids for unique lots of coal into standardized units of value to the buyer (e.g., price-per-unit-of-energy bids such as ¢/Million BTU). After all of the $/ton bids are transformed into ¢/Million BTU bids, the buyer can readily identify the market leading bids.

It should be noted that the standardized units of value to the buyer can include various forms, such as a cost per unit of thermal content from the coal, a cost per unit of electrical energy output from a generation facility burning the coal, the revenue from selling electrical energy output of a generation facility burning the coal, a measure of profit contribution from selling electrical energy output of a generation facility burning the coal, a measure of the net present value of a decision to accept the coal, wherein the decision is modeled to take into account the overall improvement in the buyer's economic condition, including revenue generated, costs avoided, risks mitigated, or asset valuation improved.

The latter example is a function that implements the notion that accepting a certain coal bid might have a portfolio effect on the buyer's overall situation, or might change the economics of a certain project. For example, a buyer might be considering whether to build a new power plant, and since coal is a high percentage of the life cycle cost of the power plant, changes in the price of coal offered to the buyer might change the overall value of the plant.

The transformation function used in the coal market has been modeled as a linear transformation. In this linear transformation, a suppliers raw $/ton bid is modified using multiplicative and additive adjustments (or factors) to yield a ¢/Million BTU bid. Each of the multiplicative and additive factors are based upon characteristics (e.g., coal characteristics, delivery specifications, etc.) of a submitted bid.

It should be noted that the characteristics of a supplier's coal might have been identified prior to the start of the auction. In this case, multiplicative and additive factors are determined prior to the start of the auction and stored in memory by the server component. During the auction process, the multiplicative and additive factors are retrieved from memory and used to transform the raw $/ton bid into a ¢/Million BTU bid. In one embodiment, a multiplicative and/or additive factor is stored by the server component for each of the characteristics of the supplier's coal. In an alternative embodiment, a single multiplicative factor and a single additive factor, representative of the cumulative effect of the characteristics of the coal in the linear transformation, is stored.

In another scenario, the characteristics of a supplier's coal are provided as part of a supplier's first submitted bid along with the raw $/ton bid to the server component. In this case, the characteristics of the supplier's coal (i.e., BTU/lb, % sulfur, % ash, % water, etc.) would be fed by the server component into the transformation function to determine, in real-time, the buyer comparative bid parameter that is the result of the transformation function. The server component may store the net result of the transformation function factors in memory for retrieval in the transformation of future bids by that supplier.

The transformation process in the coal market example can be generically characterized by the transformation process illustrated in FIG. 4. In the coal market example, the output of the transformation process is the ¢/Million BTU parameter. The ¢/Million BTU parameter represents the basis upon which a buyer will compare the bids submitted by the participating suppliers. Accordingly, the ¢/Million BTU parameter represents a buyer comparative bid parameter.

In the coal example, the transformation process takes as inputs both comparative and non-comparative bid parameters. The non-comparative bid parameters represent the characteristics of the coal (i.e., BTU/lb, % sulfur, % ash, % water, delivery time, etc.) and the characteristics of the buyer. The $/ton price parameter represents a supplier comparative bid parameter. In combination, the comparative and non-comparative bid parameters are operated upon by the transformation function (f) to yield the buyer comparative bid parameter value in ¢/Million BTU.

At this point, it should be noted that the supplier comparative bid parameter ($/ton) is significant because it enables the supplier to view a relative comparison of bids in the supplier's individual context. This feature of the present invention will be described in greater detail below in the discussion of the detransformation and feedback parts of the auction process.

Figure 5A:
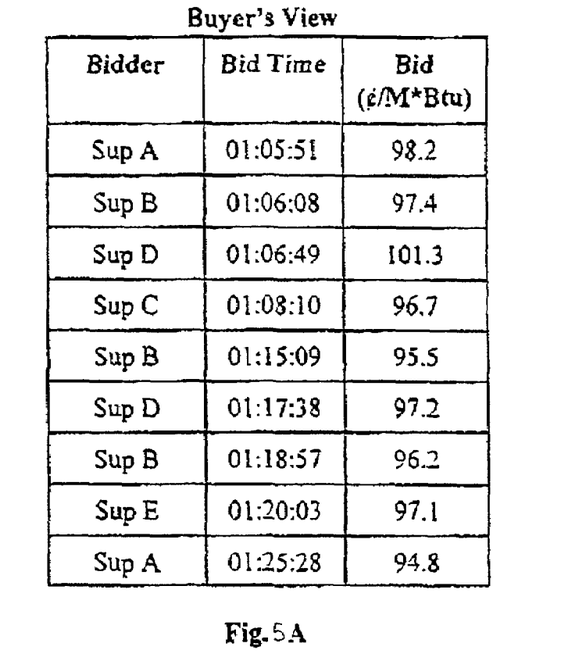
FIGS. 5A–C are bid history charts based upon buyer and supplier viewpoints.

After each of the submitted bids have been transformed into the buyer comparative bid parameter ¢/Million BTU, an "apples-to-apples" comparison can be performed. The "apples-to-apples" comparison can be effected in any of a variety of ways including the bid history chart of FIG. 5A. The bid history chart of FIG. 5A illustrates a relative ranking of transformed received bids in ¢/Million BTU.

Having received a bid from a participating supplier, the auction server must then broadcast market feedback to the other participating suppliers. This broadcast function creates a real-time online competition between suppliers who are able to view the activities of their competitors and plan their corresponding response strategy.

In the coal market, the specific factors used in the transformation function are often confidential to the buyer. Accordingly, the buyer desires to prevent the suppliers from gaining insight into aspects of the transformation function that quantifies the buyer's weighting of various parameters associated with a supplier's bid. For this reason, the auction server does not feedback the transformed bids to the participating suppliers. Rather, the auction server broadcasts bids that have been detransformed from the buyer comparative bid parameter (i.e., ¢/Million BTU) into the context (i.e., $/ton) of the individual suppliers.

The $/ton bid for a supplier is referred to as the supplier comparative bid parameter. As illustrated in FIG. 4, the supplier comparative bid parameter is one of the inputs into the transformation function (f). The supplier comparative bid parameter is significant because it enables the supplier to view the auction competition in his own context. In other words, a supplier can view all competing bids as if all suppliers were offering the same type of coal for sale. In this manner, a supplier can view the competitive auction landscape without receiving any information concerning the transformation function that has been defined by the buyer.

In the coal example, the transformation process is modeled as a linear function, having at least one multiplicative factor and/or at least one additive factor. This transformation can be represented by the well known algebraic function $y=mx+b$, where m is the multiplicative factor, b is the additive factor, x is the supplier comparative bid parameter, and y is the buyer comparative bid parameter.

Bids viewed in the buyer's context have been converted into the buyer comparative bid parameter (i.e., ¢/Million BTU). On the supplier side, each of the bids submitted from other participating suppliers are detransformed from the buyer comparative bid parameter into the supplier comparative bid parameter. This detransformation is accomplished by solving the formula for x to yield the formula $x=(y-b)/m$. In this detransformation process, ¢/Million BTU bid values that are to be broadcast to Supplier A are converted to $/ton bid values using the multiplicative and/or additive factors for Supplier A.

After the client component at Supplier A receives the detransformed bid values, Supplier A is then able to view a relative comparison of the bids in his own context. This relative comparison corresponds to the relative comparison of the bids in the buyer context. FIG. 6B illustrates a bid history chart in the context of Supplier A. In this example, it is assumed that Supplier A's multiplicative and additive factors are, m=0.87 and b=80, respectively.

Figure 5B:
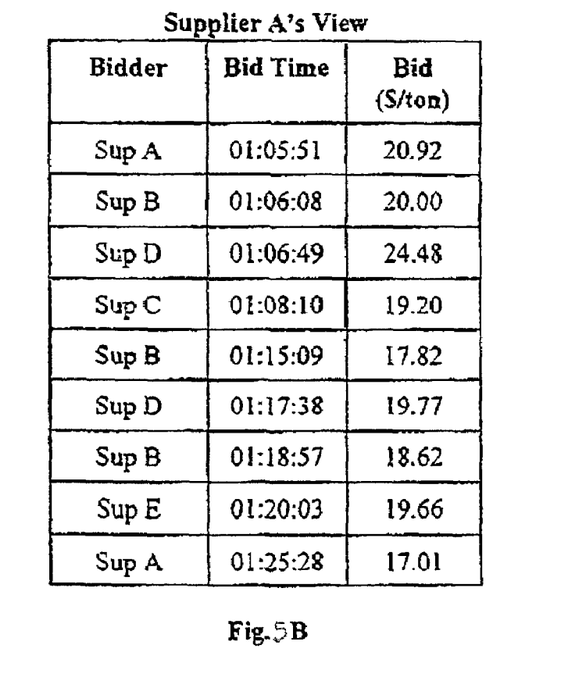

As FIG. 5B demonstrates, Supplier A can view the competitive climate of the auction without having access to any of the details of the transformation function (f) implemented by the buyer. From Supplier A's perspective, all other suppliers are bidding the same type of coal. Competition is therefore perceived as being based on the $/ton price, not the ¢/Million BTU price. If Supplier A decides to beat the market leading bid, Supplier A would simply reduce his $/ton bid and submit the new bid (e.g., bid of $17.01/ton bid at 01:25:28) to the auction server. The new $17.01/ton bid would then be transformed into a 94.8 ¢/Million BTU bid, i.e., 0.87*17.01+80=94.8 ¢/Million BTU, using the multiplicative and additive adjustments for Supplier A.

Figure 5C:
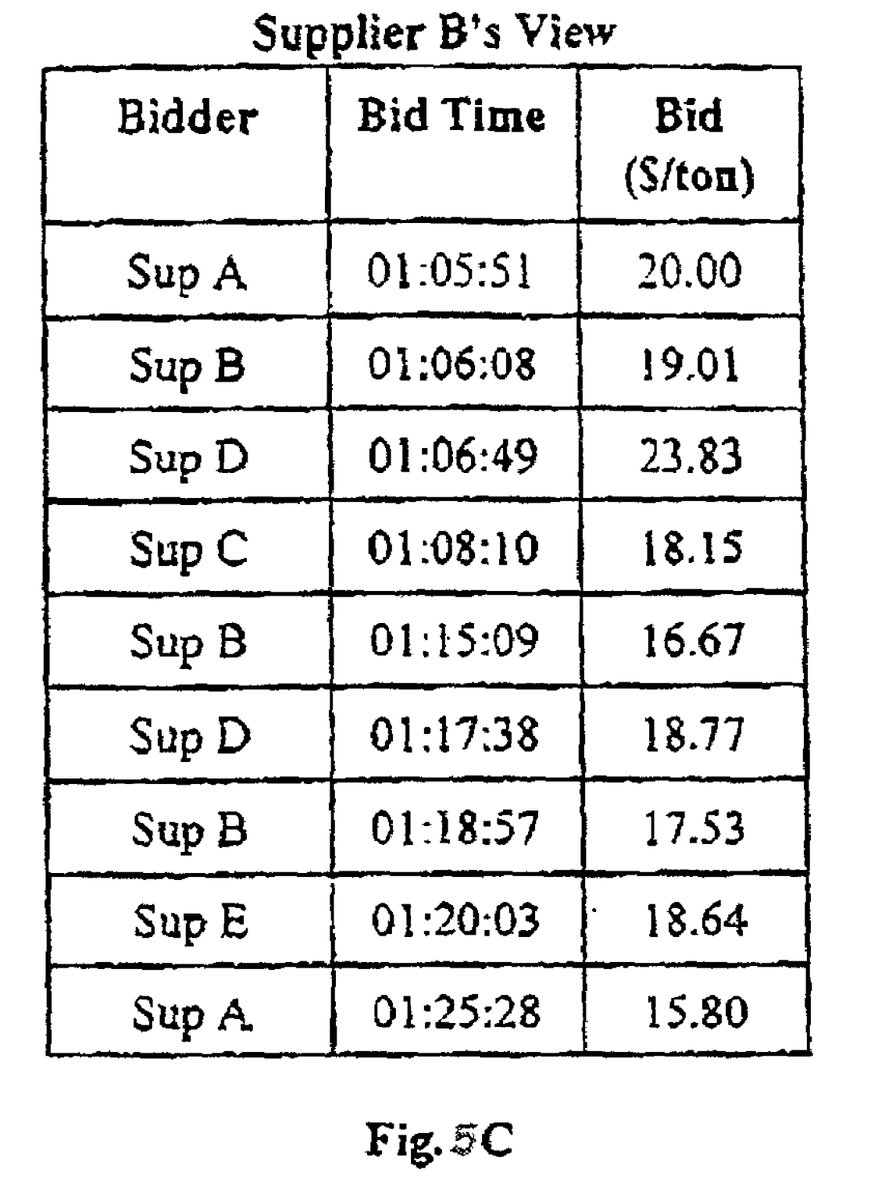

In a similar manner, Supplier B can also view the competitive climate of the auction without having access to any of the details of the transformation function implemented by the buyer. Supplier B's view is illustrated in FIG. 5C. In this example, it is assumed that Supplier B's multiplicative and additive factors are, m=0.81 and b=82, respectively. In Supplier B's view, Supplier A's new bid of $17.01/ton (or 94.8 ¢/Million BTU) at 01:25:28 is fed back to Supplier B as a $15.80/ton bid, i.e., (94.8−82)/0.81=$15.80/ton, using Supplier B's multiplicative and additive parameters.

In combination, FIGS. 5A–5C illustrate a feature of the present invention that enables each supplier to view the auction in his own context. These buyer-specific and supplier-specific contexts enable the system to create a coal auction market without revealing confidential information to the suppliers. The creation of an online electronic auction greatly benefits the buyer by allowing the buyer to get true market prices. The online electronic auction can easily produce hundreds of bids in a span of a few hours. This is in sharp contrast to traditional coal market mechanisms that relied upon the simultaneous occurrence of independent negotiations over a course of weeks.

It should be noted that a supplier may simultaneously offer a plurality of products of differing technical specifications. In this case, the transformation function must treat these offerings separately. Each offering has its own context, and an array of detransformed bid values unique to that offering.

It should be noted that a supplier could also modify a bid by changing a non-price parameter. For example, instead of changing the $/ton bid, a supplier could choose to change a particular characteristic (e.g., % ash, % sulfur, etc.) of the coal that is being bid. This new type of coal can be based upon a mixture or blend of different types of coal within the supplier's control. By adjusting the characteristics of the coal, the supplier is effectively adjusting the multiplicative factor and/or additive factor that defines his transformation function. For this reason, the new blend of coal would define a new context for that supplier. The supplier would then have the option of amending an existing offering or creating a second offering. If the supplier creates a new offering, viewing that new blended bid within the context of the auction market would require a second bid history chart. In effect, the supplier has entered two horses into the race. This has the additional benefit to suppliers of allowing them to balance their own supply with market demand in the most beneficial manner.

Another example of transformation bidding is multi-currency bidding. Multi-currency bidding is an auction format wherein the buyer views all submitted bids in a base currency (e.g., U.S. dollars), while each of the suppliers view all submitted bids in a local currency (e.g., Japanese Yen, Swiss Francs, etc.). Multi-currency bidding is described in co-pending U.S. application Ser. No. 09/282,158, entitled "Method and System for Conducting Electronic Auctions with Multi-Currency Bidding,", the disclosure of which is hereby expressly incorporated in the present application.

In the multi-currency bidding example, the local currency represents a supplier comparative bid parameter. The exchange rate between the local currency and the base currency represents a non-comparative bid parameter. It should be noted that in the multi-currency example, the non-comparative bid parameter is provided by the buyer or independent party instead of the supplier. In effect, the supplier's bid is a single parameter (i.e., local currency price) to be transformed into a buyer comparative bid parameter (i.e., base currency price).

In a similar fashion as the coal market example, each of the suppliers can view the auction in their own context (or local currency). Here, confidentiality of the transformation process is not the driver for separate supplier views. Rather, separate supplier views are desired because of user unfamiliarity of viewing prices in a foreign currency. Detransformation is represented by the conversion of base currency bids into the relevant local currency.

In the multi-currency bidding application, the exchange rates are not confidential. Accordingly, the transformation/detransformation process can be performed at the client component and/or the auction server component. For example, assume that Supplier A is bidding in Japanese Yen, Supplier B is bidding in Swiss Francs, and the buyer is viewing the auction in U.S. dollars. The client component of Supplier A can submit the bid in Yen or in U.S. dollars. If the bid is to be submitted in U.S. dollars, the client component is configured to convert the bid to dollars prior to submission to the auction server.

On the receiving end, the client component of Supplier B can receive a bid price submitted by Supplier A in Yen, U.S. dollars or Swiss Francs. If the auction server sends a bid submitted by Supplier A in yen to Supplier B, the auction server is performing the detransformation process (i.e., currency exchange to Yen). In this case, no currency conversion is required by the client component of Supplier B. Alternatively, the client component of Supplier B can be configured to perform the currency exchange of Supplier A's bid. This currency exchange can be based upon the receipt of a bid in the base currency (U.S. dollars) or Supplier A's local currency (Yen). In this case, the currency conversion is performed by the client component of Supplier B prior to the display of Supplier A's bid to Supplier B.

In other embodiments, multi-parameter price equalization bidding can be used to solve other problems when price alone cannot adequately discriminate between a plurality of offerings. One example concerns transportation costs. Because buyers often control inbound transportation and have favorable contract rates, the transformation function might be configured to translate bids of FOB supplier pricing into bids of FOB buyer. Another example concerns penalty factors buyers might apply. Some suppliers may be assessed penalties due to additional cost factors the buyer might have to assume. For example, an overseas supplier might be automatically penalized a given percent or fixed amount to cover the extra costs of travel, input/export duties, and international banking fees.

In other embodiments, the transformation function that converts the supplier comparative bid parameter into buyer comparative bid parameters might be non-linear. This non-linear transformation may be implemented in a variety of ways. In one embodiment, the algebraic transformation function (f) is defined as a non-linear function rather than a linear function. The form of this function might be a polynomial such as $y=nx^2+mx+b$. It might also use logarithms or power functions.

In another embodiment, the transformation function (f) uses lookup tables. A lookup table is a form of transformation function whereby a given input value or range of input values is translated into a given output value. The lookup table is constructed in advance in such a way that all possible values of input are translated into an acceptable value of output.

Non-linear transformation functions can serve to provide additional emphasis to certain parameters. For example, a product's value may rise at a faster rate as a certain quality factor approaches perfection. The value of a perfect diamond, for example, can be many times higher than the value of a slightly imperfect diamond. However, as the level of imperfection rises, the drop off in value slows. This is a non-linear transformation from an engineering attribute into value.

Lookup tables can be used to simplify preparation. For example, consider the problem of translating FOB supplier prices into FOB buyer prices, including transportation costs between a supplier and a buyer. In theory, a linear transportation function might be used to apply an additive factor such as "cents per unit per mile shipped." In practice, it can be far simpler to prepare an auction using a rule such as "within 100 miles shipping is $0.01 per unit, between 101–250 miles shipping is $0.03 per unit, and above 250 miles shipping is $0.05 per unit." In this case, a lookup table provides an easier implementation. In this framework, supplier A located 60 miles from the buyer would be assessed $0.01 per unit for shipping, while supplier B located 105 miles from the buyer and supplier C located 230 miles away would both be assessed $0.03 per unit.

It should be noted that a combination of linear, non-linear, and lookup table transformations might apply to any given auction. For example, a linear transformation function might be used, where various additive transformation factors are themselves the output values from a lookup table, another linear function, or a non-linear function. In other words, the transformation functions may be nested to include more than one type of calculation in any given embodiment.

Generally, where the transformation function is non-confidential, the transformation process can be implemented individually or jointly by the auction server component and the individual client components. The joint implementation can be designed in various ways to achieve the same goal, the support of individual buyer and supplier views.

As noted above, the transformation process can also be used in a context where only a single view of the auction is available. Here, the buyer and each of the participating suppliers each view the auction based on the buyer comparative bid parameter (e.g., NPV bidding).

Yet another embodiment of transformational bidding includes rebates and discounts. In addition to the bid parameters described above, rebates and/or discounts may be included and operated upon by the transformation function (f) to yield the buyer comparative bid parameter value.

Figure 6:
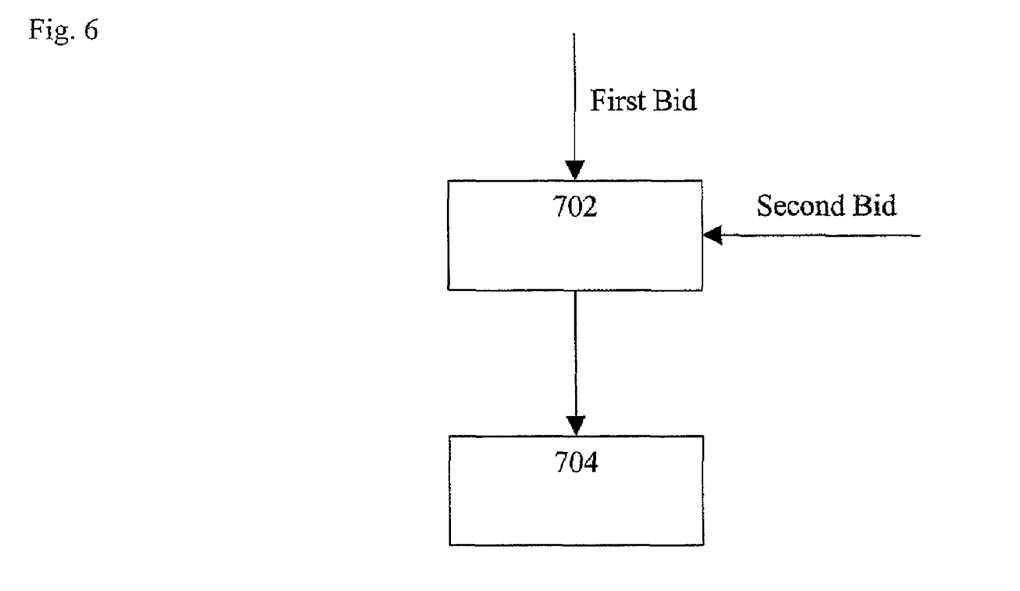
FIG. 6 is a block flow diagram illustrating an embodiment of a transformation process of the present invention.

FIG. 6 illustrates a block flow diagram of a transformation including rebates and discounts in accordance with one embodiment of the invention. This preferred embodiment of the invention applies the transformation function described with respect to FIGS. 1–5 above with rebates and discounts. Although FIG. 6 and other figures presented herein may include a particular sequence of steps, it can be appreciated that the sequence of steps merely provides an example of how the general functionality described herein can be implemented. Further, each sequence of steps does not have to be executed in the order presented unless otherwise indicated.

As shown in FIG. 6, a first bid having a first value and a first unit of measurement is received at step 702. A second bid having a second value and a second unit of measurement is received at step 702 as well. At step 704, the first and second values are transformed to third and fourth values, respectively, having a standard unit of measurement. For example, a standard unit of measurement might be a NPV for each of the total leasing costs and total buy costs, as described in more detail in the '156 Application.

Before receiving the first bid and second bid, the auction coordinator 20 may solicit potential bidders 30, as shown in FIG. 1A. In one embodiment, the auction coordinator 20 prepares a request for quotation, provides the request for quotation to potential bidders 30, and requests the potential bidders 30 to respond to the request for quotation. The request preferably identifies of the goods or services to be purchased.

In another embodiment of the invention, the first and second values are transformed by determining a first transformation factor for the first value, and a second transformation factor for the second value. The first value is transformed using the first transformation factor, and the second value is transformed using the second transformation factor. In particular, the first value and the second value are transformed via a linear transformation for each value, with the linear transform having a multiplicative adjustment or an additive adjustment. For example, the first value and second value may be transformed by multiplying the first value by the first transformation factor and the second value by the second transformation factor.

The first and second transformation factors may be determined using any number of methods. For example, one method for determining the first and second transformation factors comprises storing the first and second transformation factors in a look-up table using computer memory, searching the look-up table for the first and second transformation factors, and retrieving the first and second transformation factors in accordance with the search.

In this method, the transformation factors for each type of bid are calculated before the start time for a particular lot in an electronic auction. The transformation factors are stored in computer-readable memory in the form of a look-up table. Whenever a bid is received, the system searches the look-up table for the appropriate transformation factor and retrieves the transformation factor from memory. This method avoids the necessity of calculating a transformation factor for each bid during the relatively short time interval that an electronic auction is open. This also reduces the processing requirements and therefore complexity of the overall system.

Another method for determining the first transformation factor includes identifying a first set of transformation variables for the first value, specifying a first transformation function to derive the standard unit of measurement using the first value and the first set of transformation variables, receiving a value for each of the first set of transformation variables, and calculating the first transformation factor using the received values and the first transformation function. This method permits a transformation factor to be calculated as each bid is received. This may be desirable if the values for the transformation variables, or the transformation variable themselves, are dynamic in nature. In this case a static transformation factor may not be appropriate depending on the level of accuracy required for a particular bidding event. In one embodiment, the first and second bidders are electronically coupled to an auction coordinator during the auction and the first and second bids are submitted to the auction coordinator online during the auction.

Similarly, a method for determining the second transformation factor includes identifying a second set of transformation variables for the second value, specifying a second transformation function to derive the standard unit of measurement using the second value and the second set of transformation variables, receiving a value for each of the second set of transformation variables, and calculating the second transformation factor using the received values and the second transformation function.

It is worthy to note that any number or type of transformation variables can be used for a desired transformation function and still fall within the scope of the invention. Additional bids with additional values may also be converted to the standard unit of measurement. Furthermore, the transformation functions described with respect to FIG. 6 may be implemented using the generic transformation 500 described with respect to FIG. 4.

In one embodiment of the invention, the standard unit of measurement is a buyer comparative bid parameter. In particular, the buyer comparative bid parameter represents a net present value.

Once the different bids are normalized using a standard unit of measurement, the third and fourth values are compared. The third value is then ranked with respect to the fourth value in accordance with the comparison. This relative ranking is then displayed to the buyer.

In one example of transformational bidding with rebates and discounts, business discounts are factored into bids in an auction for accessories. Often, a single most competitive, high quality supplier is desired, so the discounts may have a significant impact on the award decision. The discount may include a fixed percentage price reduction, such as 20%, for the accessories after a $250^{th}$ production unit for a total of 7000 units. In the initial RFQ, the maximum bid value may be increased by approximately 29% to account for this price reduction so that the 20% discount is properly factored into the bids. If a ten-year contract period is used as a normalizing period of time, the resulting transformational bidding equation is:

$$A=B-C/D$$

Where:
 A=Transformed Bid
 B=Entered Bid
 C=Total Cumulative Savings for ten-year contract period, such as between 2001 and 2010 inclusive.
 D=5798=[250*1.0+(7185−250)*0.8], where 7185 is equal to the Total Forecast Volume between 2001 and 2010 and the 20% price discount is accounted for after the $250^{th}$ unit.

Not only is it important for the buyer to have bids with different units of measure transformed to a standard or uniform unit of measure, it is important for the sellers (i.e., bidders) to understand where their bid stands in relation to the other sellers. This need, however, must be balanced against the need of the buyer to keep certain information from the sellers to ensure a particular seller does not have a bidding advantage. Therefore, one embodiment of the invention allows for bids having a different unit of measure than used by one particular bidder to be converted to a unit of measure used by that particular bidder. Using the above methods, assume the first bid is from a first bidder and the second bid is from a second bidder. The third value (e.g., representing the transformed first value submitted by the first bidder) is detransformed to a fifth value having the second unit of measurement. Similarly, the fourth value (e.g., representing the transformed second value submitted by the second bidder) is detransformed to a sixth value having the first unit of measurement. The fifth value is then sent, or transmitted, to the second bidder so that the second bidder can know where their bid ranks with respect to other bids, even if the other bids use a different unit of measurement. The sixth value is sent to the first bidder for the same reasons. In other words, the bids from other bidders using a different unit of measurement are converted to the unit of measurement used by a particular bidder so that the particular bidder is made aware of where its bid ranks in comparison to the other bids. The detransformation process may be implemented using transformation 800 and its appropriate mathematical and functional variations, as well as the process described with respect to FIGS. 5A–5C.

The embodiments of the invention may be implemented by a processor-based computer system. The system includes a database for receiving and storing bid information, including rebates and discounts, from at least one bidder, and software for transforming bid information into values having the standard unit of measurement. The system also preferably includes a database for storing the lookup table of transformation factors that convert the bid information into the values having the standard unit of measurement.

With reference to FIG. 3, a computer system 20 operates to execute the functionality for server component 23. Computer system 20 includes a processor 21, a memory 22A and a disk storage 22B. Memory 22A stores computer program instructions and data. Processor 21 executes the program instructions or software, and processes the data, stored in memory 22A. Disk storage 22B stores data to be transferred to and from memory 22A. All these elements are interconnected by one or more buses, which allows data to be intercommunicated between the elements.

Processor 21 can be any type of processor capable of providing the speed and functionality required by the embodiments of the invention. For example, processor 21 could be a processor from a family of processors made by Intel Corporation or Motorola.

For purposes of this application, memory 22A and disk 22B are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 20 may contain various combinations of machine readable storage devices, which are accessible by processor 21 and which are capable of storing a combination of computer program instructions and data.

Memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions. For some embodiments of the invention, the program partition contains program instructions that performs the buy versus leasing transformation functionality described above.

Computer system 20 also includes a network interface 28. Network interface 28 may be any suitable means for controlling communication signals between network devices using a desired set of communications protocols, services and operating procedures. Communication protocols are layered, which is also referred to as a protocol stack, as represented by operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 3 also shows a computer system 15 that operates to execute the functionality for client component 16. Computer system 15 includes a processor 31, a memory 32A, disk storage 32B, a communications interface 38, and a protocol stack having a CBE-communication layer 37 and a TCP/IP layer 35. These elements operate in a manner similar to the corresponding elements for computer system 20.

Another embodiment of the present invention includes a first machine readable code that receives bid information from a bidder, a second machine readable code that receives at least one of a rebate and discount from the bidder, a third machine readable code that generates a transformed bid using the bid information and the at least one of the rebate and discount, and a fourth readable code that transmits the transformed bid information to an auction server to generate a relative comparison of bids on a common competitive basis.

It should be noted that the mechanism for transformational bidding with rebates and discounts described above may also be applied to transformational bidding with agent's commissions and/or finder's fees. In this case, agent's commissions or finder's fees for finding a supplier would be applied to the transformed bids from suppliers provided by the agent or finder. The mechanism described for rebates and discounts would apply, but instead of reducing costs in the transformed bid to account for the rebates and discounts, costs would be added to the transformed bid.

While the invention has been described in detail and with reference to specific embodiments thereof, it will be apparent to one skilled in the art that various changes and modifications can be made therein without departing from the spirit and scope thereof. For example, while the auction functions described above have been described in the context of downward pricing (reverse) auctions, the auction functions can be equally applied to upward pricing (forward) auctions. Thus, it is intended that the present invention covers the modifications and variations of this invention provided they come within the scope of the appended claims and their equivalents.

What is claimed is:

1. A computer implemented method of transformational bidding with rebates and discounts in an online auction performed by a computer server, the method comprising:

receiving electronically at the computer server data representing a first bid from a first bidder and a second bid from a second bidder over a network, wherein at least one of a rebate and discount is offered with at least one of the first and second bids, and wherein the first and second bidders are seller bidders remotely located with respect to the computer server over the network;

in response to the first and second bids, the computer server executing one or more computer instructions to assign a first value and a first unit of measurement for the first bid and a second value and second unit of measurement for the second bid using in part the at least one of a rebate and discount offered with at least one of the first and second bids;

the computer server transforming the first and second values to third and fourth values, respectively, having a standard unit of measurement, the third and fourth values representing the first and second bids of the first and second bidders in view of the standard unit of measurement;

the computer server detransforming the third value to a fifth value having the second unit of measurement;

the computer server detransforming the fourth value to a sixth value having the first unit of measurement; and the computer server transmitting the fifth value to the second bidder and the sixth value to the first bidder, wherein the fifth value represents the first bid from the first bidder in view of measurement units of the second bidder, and wherein the sixth value represents the second bid from the second bidder in view of measurement units of the first bidder, such that the first and second bidders can use the fifth and sixth values to determine in their respective own views ranking of their respective bidding situations with respect to other bidders.

2. The method of claim 1 wherein the transforming comprises:

determining a first transformation factor for the first value;

determining a second transformation factor for the second value; and converting the first value using the first transformation factor and the second value using the second transformation factor.

3. The method of claim 2 wherein the transforming comprises:

multiplying the first value by the first transformation factor and the second value by the second transformation factor.

4. The method of claim 2 wherein the determining comprises:

searching on a look-up table for the first and second transformation factors; and retrieving the first and second transformation factors in accordance with the search.

5. The method of claim 1 wherein the- transforming comprises:

performing a linear transformation for the first and second values having at least one of a multiplicative adjustment and an additive adjustment.

6. The method of claim 1 wherein the receiving comprises:

electronically coupling the first and second bidders to an auction coordinator during the auction; and submitting the first and second bids to the auction coordinator online during the auction.

7. The method of claim 1 further comprising:

receiving at least one additional bid having an additional value from at least one additional bidder; and transforming the additional value to a converted value having the standard unit of measurement.

8. The method of claim 1 further comprising:

conducting the auction as a reverse auction.

9. The method of claim 1 further comprising:

conducting the auction as a forward auction.

10. The method of claim 1 further comprising:

soliciting potential bidders.

11. The method of claim 10 wherein the soliciting comprises:

preparing a request for quotation;

providing the request for quotation to potential bidders; and requesting the potential bidders to respond to the request for quotation.

12. The method of claim 11 wherein the requesting comprises:

identifying goods to be purchased.

13. The method of claim 12 wherein the requesting comprises:

identifying services to be purchased.

14. The method of claim 1 wherein the transforming comprises:

determining the standard unit of measurement according to a buyer comparative bid parameter.

15. The method of claim 1 further comprising:

comparing the third and fourth values;

and ranking the third value with respect to the fourth value.

16. The method of claim 15 further comprising:

displaying the ranking to a buyer.

17. A computer implemented method of transformational bidding with rebates and discounts in an online auction performed by a computer server, the method comprising:

receiving electronically at the computer server data representing a first bid from a first bidder and a second bid from a second bidder over a network, wherein at least one of a rebate and discount is offered with at least one of the first and second bids, and wherein the first and second bidders are seller bidders remotely located with respect to the computer server over the network;

in response to the first and second bids, the computer server assigning a first value and a first unit of measurement for the first bid and a second value and second unit of measurement for the second bid using in part the at least one of a rebate and discount offered with at least one of the first and second bids; and the computer server transforming the first and second values to third and fourth values, respectively, having a standard unit of measurement, the third and fourth values representing the first and second bids of the first and second bidders in view of the standard unit of measurement;

determining a first transformation factor for the first value and determining a second transformation factor for the second value, including identifying a first set of transformation variables for the first value and a second set of transformation variables for the second value, specifying a first transformation function to derive the standard unit of measurement using the first value and the first set of transformation variables and a second transformation function to derive the standard unit of measurement using the second value and the second set of transformation variables, receiving a value for each of the first set of transformation variables and the second set of transformation variables, and calculating the first transformation factor using the received values and the first transformation function and the second transformation factor using the received values and the second transformation function; and converting the first value using the first transformation factor and the second value using the second transformation factor, such that the first and second bidders can use the first and second values to determine in their respective own views ranking of their respective bidding situations with respect to other bidders.

18. A machine readable medium for storing instructions when executed, cause a computer server to perform a method that transforms bids with rebates and discounts in an online auction, the method comprising:

receiving electronically at the computer server data representing a first bid from a first bidder and a second bid from a second bidder over a network, wherein at least one of a rebate and discount is offered with at least one of the first and second bids, and wherein the first and second bidders are seller bidders remotely located with respect to the computer server over the network;

in response to the first and second bids, the computer server assigning a first value and a first unit of measurement for the first bid and a second value and second unit of measurement for the second bid using in part the at least one of a rebate and discount offered with at least one of the first and second bids;

the computer server transforming the first and second values to third and fourth values, respectively, having a standard unit of measurement, the third and fourth values representing the first and second bids of the first and second bidders in view of the standard unit of measurement;

the computer server detransforming the third value to a fifth value having the second unit of measurement;

the computer server detransforming the fourth value to a sixth value having the first unit of measurement; and the computer server transmitting the fifth value to the second bidder and the sixth value to the first bidder, wherein the fifth value represents the first bid from the first bidder in view of measurement units of the second bidder, and wherein the sixth value represents the second bid from the second bidder in view of measurement units of the first bidder, such that the first and second bidders can use the fifth and sixth values to determine in their respective own views ranking of their respective bidding situations with respect to other bidders.

19. A machine readable medium for storing instructions when executed, cause a computer server to perform a method that transforms bids with rebates and discounts in an online auction, the method comprising:

receiving electronically at the computer server data representing a first bid from a first bidder and a second bid from a second bidder over a network, wherein at least one of a rebate and discount is offered with at least one of the first and second bids, and wherein the first and second bidders are seller bidders remotely located with respect to the computer server over the network;

in response to the first and second bids, the computer server assigning a first value and a first unit of measurement for the first bid and a second value and second unit of measurement for the second bid using in part the at least one of a rebate and discount offered with at least one of the first and second bids; and the computer server transforming the first and second values to third and fourth values, respectively, having a standard unit of measurement, the third and fourth values representing the first and second bids of the first and second bidders in view of the standard unit of measurement;

determining a first transformation factor for the first value and determining a second transformation factor for the second value, including identifying a first set of transformation variables for the first value and a second set of transformation variables for the second value, specifying a first transformation function to derive the standard unit of measurement using the first value and the first set of transformation variables and a second transformation function to derive the standard unit of measurement using the second value and the second set of transformation variables, receiving a value for each of the first set of transformation variables and the second set of transformation variables, and calculating the first transformation factor using the received values and the first transformation function and the second transformation factor using the received values and the second transformation function; and converting the first value using the first transformation factor and the second value using the second transformation factor, such that the first and second bidders can use the first and second values to determine in their respective own views ranking of their respective bidding situations with respect to other bidders.

20. A computer server for hosting online auction, comprising:

a processor;

a memory coupled to the processor for storing instructions, when executed from the memory, cause the processor to perform operations, the operations including receiving electronically at the computer server data representing a first bid from a first bidder and a second bid from a second bidder over a network, wherein at least one of a rebate and discount is offered with at least one of the first and second bids, and wherein the first and second bidders are seller bidders remotely located with respect to the computer server over the network;

in response to the first and second bids, the computer server assigning a first value and a first unit of measurement for the first bid and a second value and second unit of measurement for the second bid using in part the at least one of a rebate and discount offered with at least one of the first and second bids;

the computer server transforming the first and second values to third and fourth values, respectively, having a standard unit of measurement, the third and fourth values representing the first and second bids of the first and second bidders in view of the standard unit of measurement;

the computer server detransforming the third value to a fifth value having the second unit of measurement;

the computer server detransforming the fourth value to a sixth value having the first unit of measurement; and the computer server transmitting the fifth value to the second bidder and the sixth value to the first bidder, wherein the fifth value represents the first bid from the first bidder in view of measurement units of the second bidder, and wherein the sixth value represents the second bid from the second bidder in view of measurement units of the first bidder, such that the first and second bidders can use the fifth and sixth values to determine in their respective own views ranking of their respective bidding situations with respect to other bidders.

21. A computer server for hosting online auction, comprising:

a processor;

a memory coupled to the processor for storing instructions, when executed from the memory, cause the processor to perform operations, the operations including receiving electronically at the computer server data representing a first bid from a first bidder and a second bid from a second bidder over a network, wherein at least one of a rebate and discount is offered with at least one of the first and second bids, and wherein the first and second bidders are seller bidders remotely located with respect to the computer server over the network;

in response to the first and second bids, the computer server assigning a first value and a first unit of measurement for the first bid and a second value and second unit of measurement for the second bid using in part the at least one of a rebate and discount offered with at least one of the first and second bids; and the computer server transforming the first and second values to third and fourth values, respectively, having a standard unit of measurement, the third and fourth values representing the first and second bids of the first and second bidders in view of the standard unit of measurement;

determining a first transformation factor for the first value and determining a second transformation factor for the second value, including identifying a first set of transformation variables for the first value and a second set of transformation variables for the second value, specifying a first transformation function to derive the standard unit of measurement using the first value and the first set of transformation variables and a second transformation function to derive the standard unit of measurement using the second value and the second set of transformation variables, receiving a value for each of the first set of transformation variables and the second set of transformation variables, and calculating the first transformation factor using the received values and the first transformation function and the second transformation factor using the received values and the second transformation function; and converting the first value using the first transformation factor and the second value using the second transformation factor, such that the first and second bidders can use the first and second values to determine in their respective own views ranking of their respective bidding situations with respect to other bidders.

* * * * *